C. B. BROWN.
Harvester.
No. 11,249.
Patented July 11, 1854.
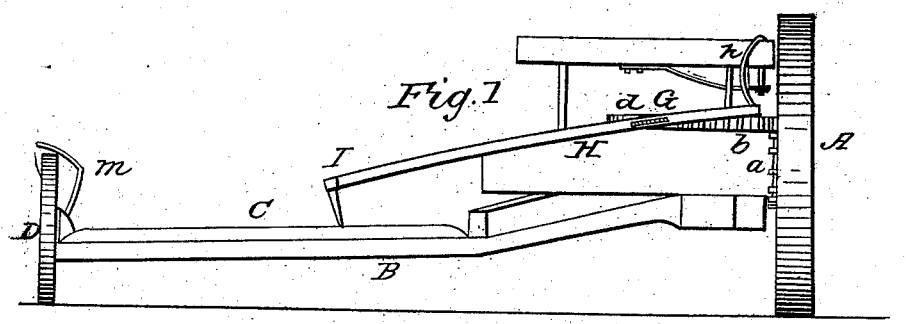
Fig. 1
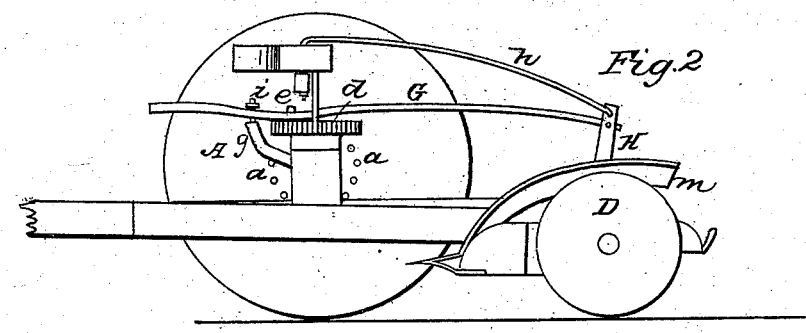
Fig. 2
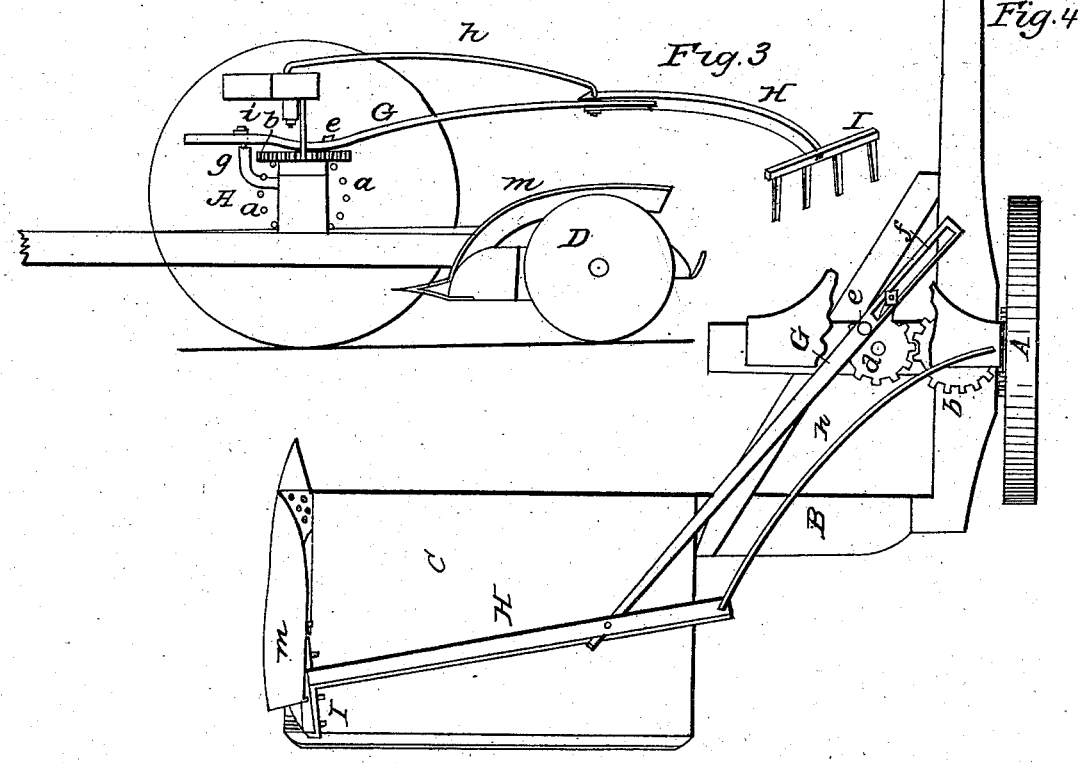
Fig. 3
Fig. 4

UNITED STATES PATENT OFFICE.

COLLINS B. BROWN, OF UPPER ALTON, ILLINOIS.

IMPROVEMENT IN HARVESTER-RAKES.

Specification forming part of Letters Patent No. 11,249, dated July 11, 1854.

*To all whom it may concern:*

Be it known that I, COLLINS B. BROWN, of Upper Alton, in the county of Madison and State of Illinois, have invented a new and useful Improvement in Machines for Harvesting Grain; and I do hereby declare that the following is a full and exact description thereof, reference being had to the accompanying drawings, making part of this specification—

Figure 1 being a rear elevation of a harvesting-machine in the position when its rake is in the act of removing in bunches the grain from the platform on which it falls; Fig. 2, a side elevation of the machine in the same position; Fig. 3, a corresponding elevation thereof when the rake is in the act of returning to remove another bunch of grain, and Fig. 4 a plan of the machine in the position when the rake has just reached the platform, before removing a bunch of grain.

Like letters designate corresponding parts in all the figures.

The nature of my invention consists in the peculiar method of giving the requisite movements to the rake I of a harvesting-machine to deposit the cut grain in bunches for binding—to wit, by means of the main moving lever G, which receives a compound vertical and horizontal movement from the crank-pin $e$, that works in a suitable bearing in the same about the distance of one-fourth its length from its inner end, and the stationary pivot $g$, which passes through a slot, $f$, formed in the portion of said lever that curves upward from the crank-pin $e$ toward the inner end of the same, and is secured therein by the nut $i$, the said lever G imparting the required movements to the rake in consequence of its outer end being jointed to the rake-handle H at a point about one-fourth its length from its outer end, and the outer end of said rake-handle being jointed to the horizontally-vibrating fulcrum-lever $h$, whose inner end turns in a fixed bearing situated over the axle and near the inner side of the wheel A, substantially as hereinafter set forth.

The frame and cutting apparatus of the machine, including the large supporting and driving wheel A, the tooth-piece B, the platform C, on which the grain falls as it is cut down, and the small supporting wheel or roller D, may be constructed in any suitable or well-known manner, my improvement being confined to the arrangement by which the rake I is operated so as to effectually discharge the grain in regular and properly-collected bunches for binding as it falls upon the said platform.

The crank-pin $e$, (or its equivalent,) whereby the main moving lever G receives its motion, is secured to a horizontal pinion, $d$, which is caused to revolve with the desired speed as the machine progresses by means of an intervening cog-wheel, $b$, playing both into said pinion and into a series of cogs, $a$, on the inner face of the driving-wheel A, or by any other suitable means. The longitudinal slot $f$, Fig. 4, in the lever G is of sufficient length to permit the longitudinal motion thereof produced by the crank-pin, while the vertical pivot $g$, which passes through said slot, remains immovably fixed to the frame of the machine.

The fulcrum-rod $h$ is arranged, substantially as represented in the drawings, so that it will vibrate freely with the rake-handle H in a horizontal plane and nearly parallel with the horizontal motions of the lever G; but it should not have any vertical play, and in order to secure a simple horizontal motion it should have an extended vertical bearing where it is jointed to the frame, as seen in Figs. 1, 2, and 3.

With the above-described arrangement of parts, as the pinion $d$ is caused to revolve by the forward motion of the machine the crank-pin $e$ produces a longitudinal reciprocating motion of the lever G, and since the slot $f$ plays forward and backward upon the stationary pivot $g$, a vibratory motion of the lever will at the same time be produced. This compound motion of the lever G, acting upon the rake-handle H at the same time that the end of the fulcrum rod or lever $h$ furnishes a vibratory center of motion to the end of said handle when properly arranged and proportioned, will cause the rake to strike the outer side of the platform C in the position shown in Fig. 4, then move over the entire width of said platform, drawing with it to the inner side thereof the grain which has fallen thereon, where having deposited the grain in a bunch upon the ground, thence move backward behind the platform, then laterally to the outer side thereof, and finally forward to the first position. (Shown in Fig. 4.) Precisely the same motions are repeated at every revolution of the pinion $d$.

When the rake has deposited a bunch of grain at the inside of the platform it must, before making its returning lateral movement, be raised sufficiently to pass above the platform, as indicated in Fig. 3, remaining thus elevated till it reaches the outer side of the platform, and then descend thereon, where it must rest during its movement over it, as indicated in Figs. 1 and 2. To accomplish this the upper side of the slotted portion of the lever G is caused, by the weight of and on its other end, to bear upward against the head $i$ on the pivot $g$ as it slides forward and backward, and is shaped in such a manner that when the rake is required to be depressed a sufficiently-depressed portion of said upper side of the lever will be beneath said head $i$, as exhibited in Fig. 2, and when the rake is to be elevated a corresponding raised portion of said upper surface of the lever will come beneath said head, as represented in Fig. 3. This alternate elevation and depression of the slotted end of the lever G produces a corresponding depression and elevation of the rake-handle H where jointed to its other end, while the end of said handle jointed to the fulcrum-lever $h$ is kept in the same horizontal plane. The combination of these two movements effects the required vertical movements of the rake.

The head $i$ may be simply a nut screwed upon the pivot $g$, and thereby be made readily adjustable.

The relative proportions of parts, (or thereabout,) as above described and represented, will in general be such as to produce the movements desired; but no precise rules can be here given, since the proportions may be indefinitely varied and still effect the desired object.

A fender, $m$, is to be placed over the wheel D and outer edge of the platform C, in order to prevent the grain falling down upon and being tangled by the rake as it descends upon the platform by allowing the rake to pass beneath said fender during that movement, as shown in Fig. 4, and also to keep the grain away from said wheel.

What I claim as my invention, and desire to secure by Letters Patent, is—

Imparting the required movements to the rake I by combining with its handle H the horizontally-vibrating fulcrum-lever $h$ and the outer end of the lever G, which has a compound vertical and horizontal movement imparted to it by means of the crank-pin $e$, pivot $g$, nut $i$, and the curved slotted inner portion of said lever G, substantially as herein set forth.

Witness my hand this 13th day of September, A. D. 1853.

COLLINS B. BROWN.

Witnesses:
   JNO. R. WOODS,
   E. M. HAZARD,
   WM. BLACKMORE.